United States Patent [19]
Nakamura et al.

[11] Patent Number: 5,666,171
[45] Date of Patent: Sep. 9, 1997

[54] LIQUID CRYSTAL IMAGE PROJECTOR

[75] Inventors: Hideki Nakamura, Ome; Yukio Suzuki, Tachikawa, both of Japan

[73] Assignee: Casio Computer Co., Ltd., Tokyo, Japan

[21] Appl. No.: 508,617

[22] Filed: Jul. 28, 1995

[30] Foreign Application Priority Data

Aug. 2, 1994 [JP] Japan ............................ 6-201318
Aug. 26, 1994 [JP] Japan ............................ 6-225975

[51] Int. Cl.⁶ ........................ G02F 1/1333; G02F 1/1335
[52] U.S. Cl. ........................................ 349/58; 349/62
[58] Field of Search ........................ 359/40, 41, 83; 349/58, 62, 67

[56] References Cited

U.S. PATENT DOCUMENTS

| | | | |
|---|---|---|---|
| 4,436,378 | 3/1984 | Kirkman | 359/49 |
| 4,536,014 | 8/1985 | Boutaleb et al. | 428/1 |
| 4,671,634 | 6/1987 | Kizaki et al. | 359/41 |
| 4,886,328 | 12/1989 | Iino | 359/40 |
| 4,950,072 | 8/1990 | Honda | 359/36 |
| 4,952,925 | 8/1990 | Haastert | 359/63 |
| 4,963,001 | 10/1990 | Miyajima | 359/83 |
| 5,103,316 | 4/1992 | Ogura | 359/43 |
| 5,243,453 | 9/1993 | Kawaguchi et al. | 359/83 |
| 5,278,596 | 1/1994 | Machtig | 359/48 |
| 5,363,227 | 11/1994 | Ichikawa et al. | 359/83 |
| 5,502,582 | 3/1996 | Larson et al. | 359/49 |
| 5,508,830 | 4/1996 | Imoto et al. | 359/40 |

FOREIGN PATENT DOCUMENTS 6-11698  1/1994  Japan .............................. 359/83

*Primary Examiner*—William L. Sikes
*Assistant Examiner*—Tiep H. Nguyen
*Attorney, Agent, or Firm*—Frishauf, Holtz, Goodman, Langer & Chick

[57] ABSTRACT

An image projector comprises a liquid crystal display module and a light source both contained in a housing. The housing is formed with an inlet and an outlet, and is provided with a fan. An air flow channel is provided between the inlet and the outlet within the housing. There is provided a wind separator in the air flow channel, which separator separates cooling air such that cooling air flows separately towards the liquid crystal display module and the light source, for better cooling effect.

18 Claims, 9 Drawing Sheets

LIQUID CRYSTAL IMAGE PROJECTOR

BACKGROUND OF THE INVENTION

1. Field of the Invention

The present invention relates to a liquid crystal image projector with a cooling system which is simple in structure.

2. Description of the Prior Art

Conventional liquid crystal apparatus is provided with a fan within or on a housing for taking in or exhausting air to cool liquid crystal elements and a light source. The conventional fan installed simply within or on the housing of the liquid crystal image projector for taking in or exhausting air can not cool the liquid crystal elements and the light source well enough for an ability of the fan, because the air entered to the housing disperses within the housing and can not reach heat generating elements such as the liquid crystal elements and the light source to cool down the same well enough.

SUMMARY OF THE INVENTION

The present invention has been made to overcome the above mentioned drawback, and has an object to provide an image projector which has a liquid crystal display module and a light source contained in a housing and which is capable of cooling the liquid crystal display module and the light source efficiently.

According to one aspect of the invention, there is provided an image projector which comprises:

a liquid crystal display module for displaying an image;
a light source for radiating light to said liquid crystal display module;
projecting means for projecting the image displayed on said liquid crystal display module;
a housing having an inlet and an outlet formed therein, for containing said liquid crystal display module and said light source, the inlet for allowing air to come inside the housing and the outlet for allowing air to go outside the housing;
an air flow channel provided within said housing, the air flow channel running from the inlet of said housing through said liquid crystal display module and said light source to the outlet of said housing;
a fan provided inside said housing, for generating air flow through said air flow channel; and
air flow separating means for separating air flow such that the air flow passes through said liquid crystal display module and the light source separately within said air flow channel.

According to another aspect of the invention, there is provided an image projector which comprises:

a liquid crystal display module for displaying an image;
a light source for radiating light to said liquid crystal display module;
a power source for supplying power to said light source;
projecting means for projecting the image displayed on said liquid crystal display module;
a housing having an inlet and an outlet formed therein, for containing said liquid crystal display module, said power source and said light source, the inlet for allowing air to come inside the housing and the outlet for allowing air to go outside the housing;
a first air flow channel provided within said housing, the first air flow channel running from the inlet of said housing through said liquid crystal display module to the outlet of said housing;
a second air flow channel provided within said housing, the second air flow channel running from the inlet of said housing through said light source to the outlet of said housing; and a fan for generating air flow through said first air flow channel and said second air flow channel.

Still another aspect of the invention, there is provided an image projector which comprises:

a housing having an inlet and an outlet formed therein, the inlet for allowing air to come inside the housing and the outlet for allowing air to go outside the housing;
a liquid crystal display panel provided in the vicinity of the inlet in said housing, for displaying an image;
a light source provided in the vicinity of the outlet in said housing, for radiating light to said liquid crystal display panel;
projecting means for projecting the image displayed on said liquid crystal display panel; and
a fan provided in the vicinity of said liquid crystal display panel in said housing, for generating a cooling air flow.

It would be apparent to those skilled in the art from the following description of preferred embodiments that the present invention may be modified in various manners and may be applicable to other apparatus.

BRIEF DESCRIPTION OF THE DRAWINGS

Other objects and structures of the present invention will be more fully understood from the description, when taken in conjunction with the accompanying drawings, in which.

DETAILED DESCRIPTION OF PREFERRED EMBODIMENTS

Now, preferred embodiments of the present invention will be described in detail with reference to the accompanying drawings.

A first embodiment of a liquid crystal image projector according to the present invention will be described with reference to FIGS. 1–5.

Figure 1:
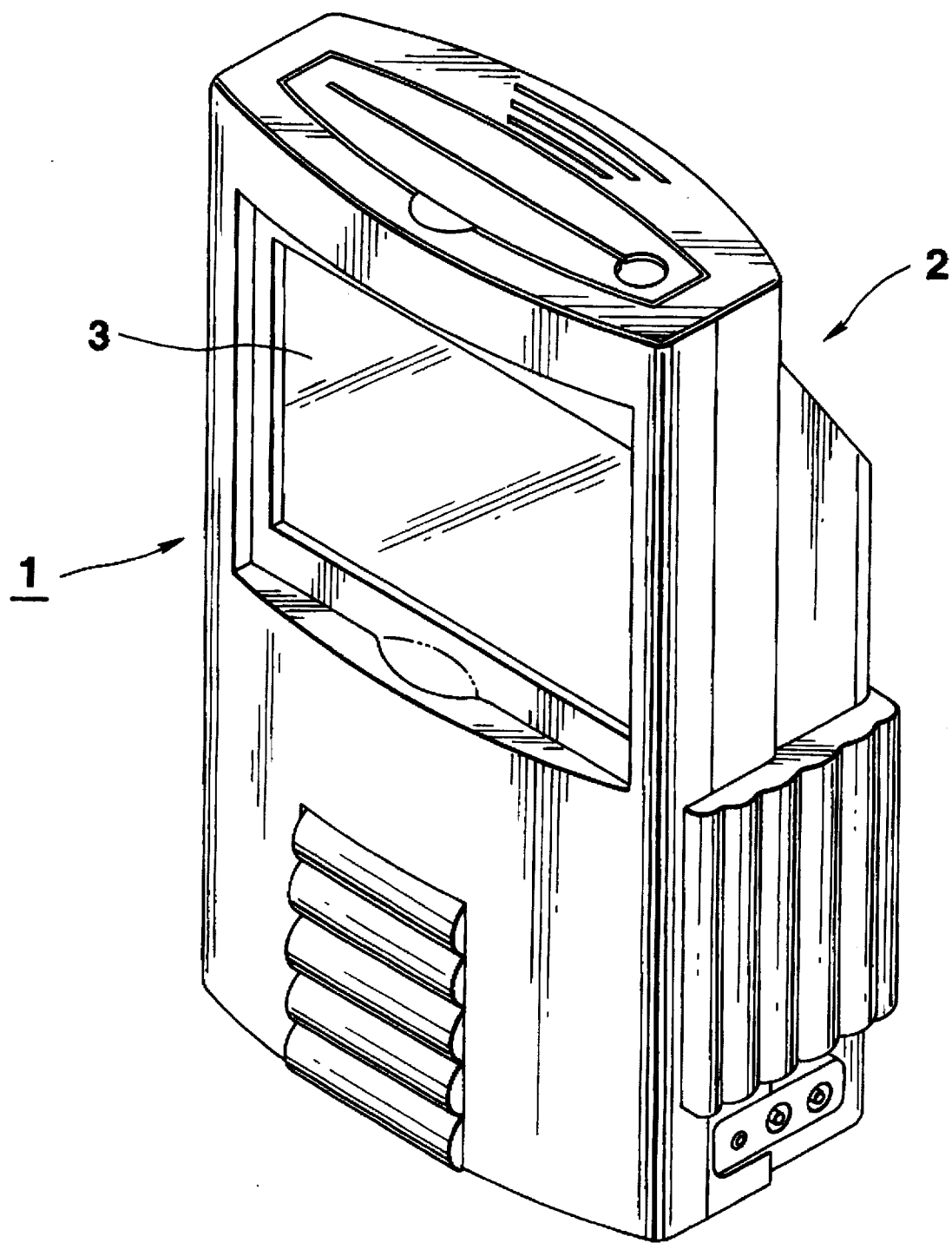
FIG. 1 is a perspective external view of a first embodiment of a liquid crystal image projector according to the present invention.

FIG. 1 is a view showing a liquid crystal projection/television receiver to be used as a liquid crystal image projector according to the present invention. Reference numeral 1 denotes the liquid crystal projection/television receiver as the liquid crystal image projector. Reference numerals 2 and 3 stand for a housing and a screen, respectively.

The liquid crystal projection/television receiver 1 is provided with the screen 3 on an upper half of a front surface of the housing 2, as shown in FIG. 1. An image is projected on the screen 3 from rearwards.

Figure 2:
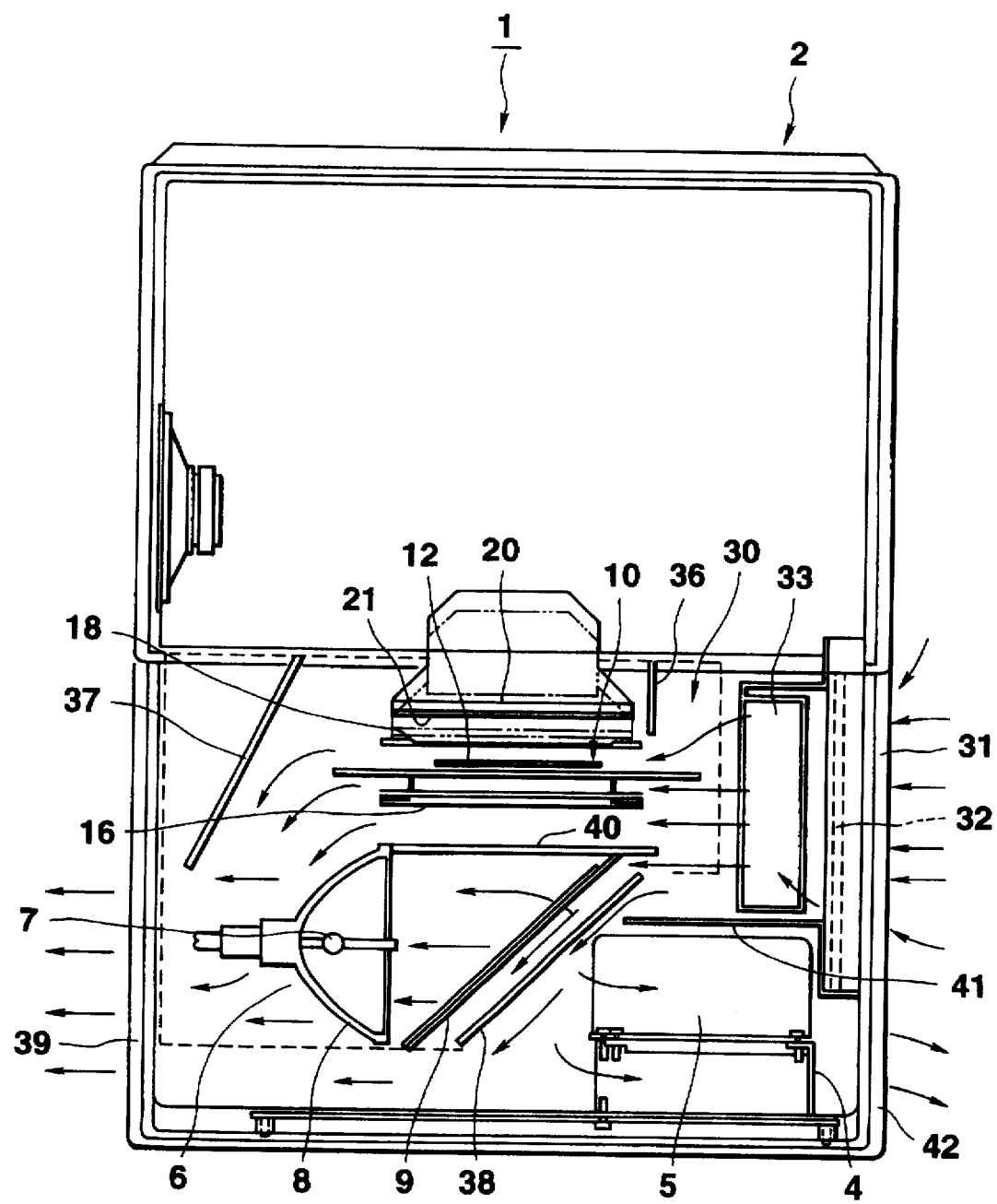
FIG. 2 is a broken away rear view of the liquid crystal image projector of FIG. 1.
Figure 3:
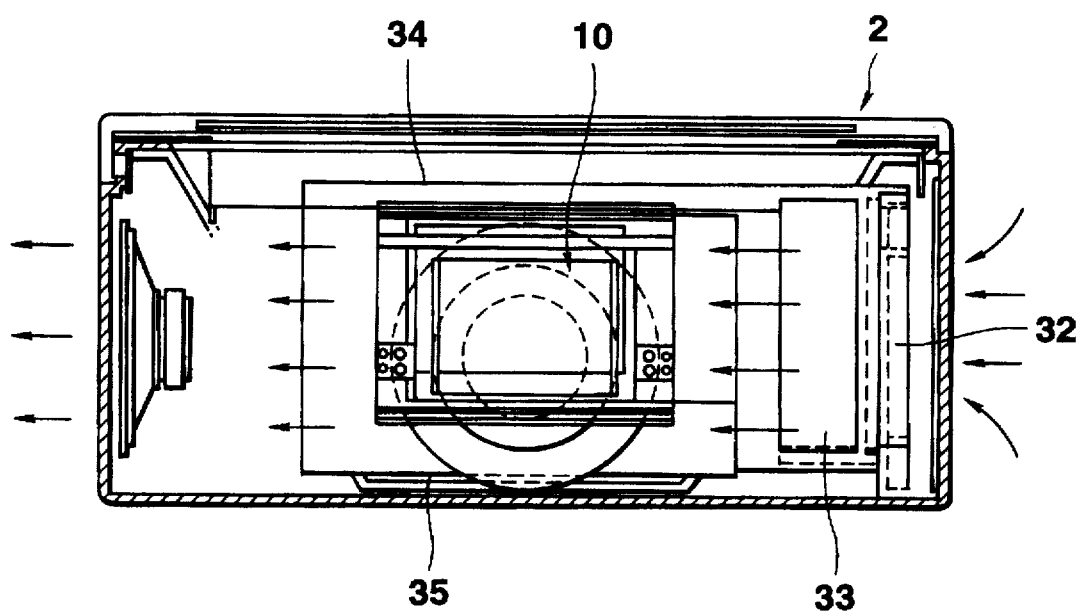
FIG. 3 is a cross sectional view of the liquid crystal image projector of FIG. 1.

FIGS. 2–3 are views showing an internal structure or a cooling system installed within the housing 2 of the liquid crystal projection/television receiver 1. 5 stands for a power source, and 6 is a light source. 9 is a dichroic mirror, 10 is a liquid crystal display module, 16 is a wind control wall (an incoming polarizing plate), 20 is a projection lens, 21 is a wind control (a lens surface), 30 is an air flow channel, 31 is an inlet, 32 is an air filter, 33 is a fan, 34, 35, 36, 37 and 38 are wind guide plates, 39 is an outlet, 40 is a cooling air separating plate, 41 is a separating plate, and 42 is an outlet.

More specifically, the power source 5 is mounted on a pedestal 4 fixed approximately at a lower-right position in the housing 2 and the light source 6 is mounted at a left side bottom of the housing 2 as viewed in FIG. 2. The light source 6 comprises a reflector 8 and a white lamp 7 installed at a focusing position of the reflector 8. The white lamp 7 is supplied with power from the power source 5.

The light source 6 comprises the white lamp 7 and the reflector 8, and white light of the white lamp 7 is reflected from the reflector 7 to be radiated in the right direction as viewed in FIG. 2, and the dichroic mirror 9 is arranged on an optical axis of the radiated white light. The dichroic mirror 9 is disposed with a surface thereof inclined at 45 degrees to horizontal in the counter clock wise direction and reflects in the upper direction three color components R, G and B of the white light radiated from the light source 6.

The liquid crystal display module 10 is disposed on the optical axis of three color components R, G and B reflected from the dichroic mirror 9. The projection lens 20 is disposed above the liquid crystal display module 10 to reflect image light transmitted through the liquid crystal display module 10. A surface 21 of the projection lens 20 is arranged in parallel with the liquid crystal display module 20 so as to serve as a control wind wall, as will be described later.

Figure 4:
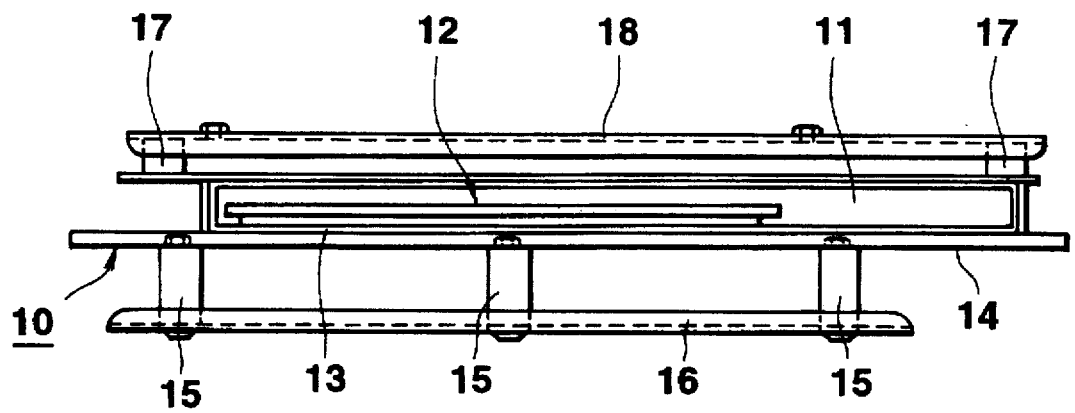
FIG. 4 is an enlarged side view of a unit including a liquid crystal display module shown in FIG. 2.

The liquid crystal display module 10 comprises a liquid crystal display panel 12 received in a sealed casing 11, as shown in detail in FIG. 4.

More specifically, the liquid crystal display panel 12, which displays an image with driven liquid crystal display elements, comprises liquid crystals filled between two glass plates. As shown in FIG. 4, an incident glass plate 13 (hereafter, an LCD glass plate) of the liquid crystal display panel 12 is received in an incident liquid crystal display module plate (hereafter, an LCM plate) 14 of the liquid crystal display module 10 including the sealed casing 11.

The incoming polarizing plate 16, i.e., the wind control wall, is secured to the lower surface of the liquid crystal display module 10 in parallel by means of supporting pins 15. An outgoing polarizing plate 18 is secured to an upper surface of the liquid crystal display module 10 in parallel by means of supporting pins 17.

In the liquid crystal projection/television receiver 1 with the above described structure, light emitted from the light source 6 is radiated to the dichroic mirror 9, and the light reflected from the dichroic mirror 9 comes in the liquid crystal display panel 12 of the liquid crystal display module 10. The image light transmitted through the liquid crystal display panel 12 with liquid crystal display elements driven is projected through the projection lens 20 in the upperwards direction, and further the image light is reflected from the reflection mirror (not shown) to be projected onto the screen 3 from a rear side thereof.

As shown in FIGS. 2 and 3, the liquid crystal display projection/television receiver 1 is provided with the air flow channel 30 in the lower half portion of the housing 2 to cool down the power source 5, the light source 6 and the liquid crystal display module 10. The air flow channel 30 is provided between an inlet 31 formed in a right side wall of the housing 2 and an outlet 39 formed in a right side wall of the housing 2 and further between the inlet 31 and an outlet 42 formed in a lower portion of the right side wall of the housing 2.

There are provided in the vicinity of the inlet 31 the air filter 32 for filtering external air and the fan 33 for supplying cooling air. Further, there are provided within the housing 2 the wind guide plates 34, 35 for guiding external air which is taken in by the fan 33 from the inlet 31 through the filter 32 to the outlet 39.

Further, there are provided the wind guide plates 36, 37 and 38 within the housing 2. The wind guide plates 36 is installed vertically between the fan 33 and the projection lens 20 for guiding cooling air supplied from the fan 33 to the liquid crystal display module 10. The wind guide plate 37 is provided so as to for guide the cooling air passed through the liquid crystal display module 10 to the light source 10. The wind guide plate 38 is mounted in parallel with the dichroic mirror 9 for cooling the dichroic mirror 9.

There is provided the cooling air separating plate 40 in parallel with the incoming polarizing plate 16 and between the liquid crystal display module 10 and the light source 6. The cooling air separating plate 40 is formed with an opening for allowing light of the light source 6 reflected from the dichroic mirror 9 to pass through to the liquid crystal display module 10. The cooling air separating plate 40 is disposed separately from the wind guide plate 38 which is installed in parallel with the dichroic mirror 9.

The separating plate 41 is disposed between the inlet 31 and the outlet 42 to separate them, and to separate the power source 5 and the filter 32 and the fan 33. The separating plate 41 is also disposed separately from the wind guide plate 38 which is installed in parallel with the dichroic mirror 9.

In the liquid crystal projection/television receiver 1 with the above cooling system, the power source 5, the light source 6 and the liquid crystal display module 10 installed within the housing 2 are cooled separately and efficiently with the power source 5 turned on to drive the fan 33. As shown by arrows in FIGS. 2 and 3, the cooling air taken into the air flow channel 30 from the inlet 31 by the fan 33 is filtered by the filter 32 to separate dust from air, and then the cooling air is supplied to the liquid crystal display module 10.

The liquid crystal display module 10 is cooled by cooling air passing through between the surface 21 of the projection lens 20 and the cooling air separating plate 40. The cooling air is prevented from running straight towards the projection lens 20 by the vertical wind guide plate 36, and is guided towards the liquid crystal display module 10.

Particularly in the vicinity of the liquid crystal display module 10, since the surface 21 of the projection lens 20 and the incoming polarizing plate 16 serve as the wind control wall to allow cooling air to flow smoothly, cooling the sealed casing 11 shown in FIG. 4 efficiently, thereby the liquid crystal display panel 12 is cooled down, too.

Meanwhile, the cooling air supplied from the fan 33 runs between the cooling air separating plate 40 and the wind guide plate 38 towards the dichroic mirror 9 and the light source 6. Further, the cooling air passing through the liquid crystal display module 10 is guided downward to the light source 6 by the wind guide plate 37. Accordingly, the light source 6 comprising the lamp 7 and the reflector 8 is cooled efficiently by the cooling air as described above.

The cooling airs passing through the liquid crystal display module 10 and the light source 6 separately come together in the vicinity of the outlet 39, and go outside the housing 2 form the outlet 39.

Meanwhile, the cooling air supplied from the fan 33 runs between the separating plate 41 and the wind guide plate 38 toward the power source 5, too to cool the same. The cooling air passing through the power source 5 goes outside the housing 2 from the outlet 42.

As described above, in the air flow channel 30 within the housing 2, the cooling air supplied from the fan 33 is separated by the cooling air separating plate 40 to flow through the liquid crystal display module 10 (the liquid crystal display panel 12) and the light source 6 separately. Therefore, the liquid crystal display elements in the liquid crystal display panel 12 and the light source 6 are cooled separately and efficiently.

As a result, the fan can be made compact, reducing noises and power consumption.

Further, in the embodiment of the liquid crystal projection/television receiver 1 of a single plate type, the cooling air separating plate 40 is provided between the light source 6 and the liquid crystal display panel 12 and in parallel with the liquid crystal display panel 12 so that the cooling air runs through the liquid crystal display panel 12 and the light source 6 separately, and, therefore, the cooling system is made simple.

In the above embodiment, the incident glass plate, i.e., the LCD glass plate 13 of the liquid crystal display panel 12 is received within the incident liquid crystal display module plate, i.e., the LCM plate 14 of the liquid crystal display module 10, as shown in FIG. 4, but the LCD glass plate 13 of the liquid crystal display panel 12 may be provided in a manner projecting from the LCM plate 14 of the liquid crystal display module 10 for better cooling effect.

Figure 5:
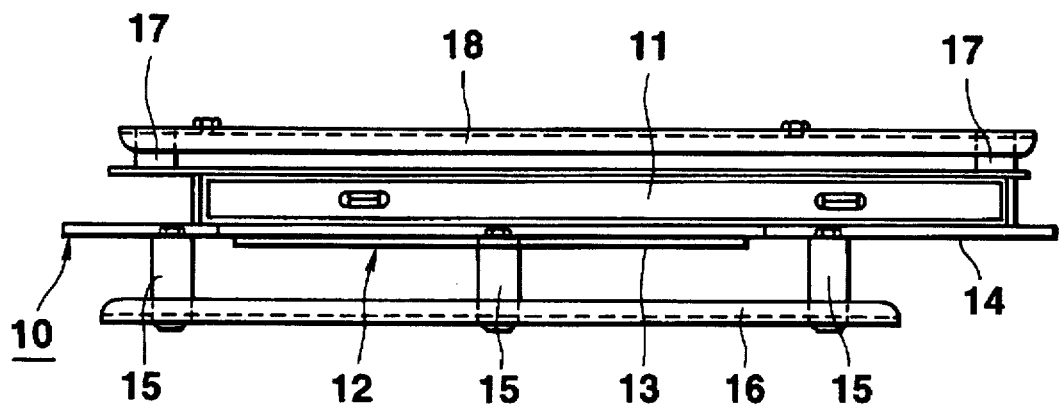
FIG. 5 is an enlarged side view of other example of the unit including the liquid crystal display module shown in FIG. 2.

More specifically, in an embodiment shown in FIG. 5, the LCD glass plate 13 of the liquid crystal display panel 12 projects from the LCM plate 14 of the liquid crystal display module 10 and is exposed in the air flow channel 30.

An experiment has been tried to measure temperatures at the center of the liquid crystal display panel 12, and results thereof are shown in a table. In the experiment, the liquid crystal display panel 12 is replaced with a dummy and a thermo couple is used to measure temperatures of the dummy.

In the table, the LCM plate 14 of the liquid crystal display module 10 is represented by A plate and the LCD glass plate 13 of the liquid crystal display panel 12 is represented by B plate. In the experiment, temperature differences between temperatures at the center of the liquid crystal display module 10 and the ambient temperature which is kept constant are measured for various distances between the A plate and the B plate. The distance between the A and B plates is expressed by minus when the LCD Glass plate (B plate) 13 is received in the LCM plate (B plate) 14, and the distance between the A and B plates is expressed by plus when the LCD Glass plate (B plate) 13 projects from the LCM plate (A plate) 14.

TABLE

| Distances (mm) | Temperature differences (°C.) |
| --- | --- |
| −1.5 | 7.5 |
| 0 | 6.6 |
| 1.5 | 5.4 |

As clearly shown by the results of the experiment, the liquid crystal display module 10 with the LCD Glass plate 13 projected from the LCM plate will be more improved in cooling effect for the liquid crystal display elements.

The embodiment of the liquid crystal projection/television receiver of a single plate type according to the present invention has been described, but the present invention may be applied to a liquid crystal projector of a single plate type excluding a projection television receiver and a liquid crystal projector of three plate type including a projection television receiver.

In the above embodiment of the liquid crystal projection/television receiver, the cooling air separating plate 40 is employed as a cooling air separating means, but other may be used for the cooling air separating means. The structure of the air flow channel including the inlet and the outlets and the position where the fan is installed may be modified in various manners.

Now, a second embodiment of the liquid crystal display projection/television receiver of the present invention will be described with reference to FIGS. 6–11. Similarly, the liquid crystal projection/television receiver is used in the second embodiment.

Figure 6:
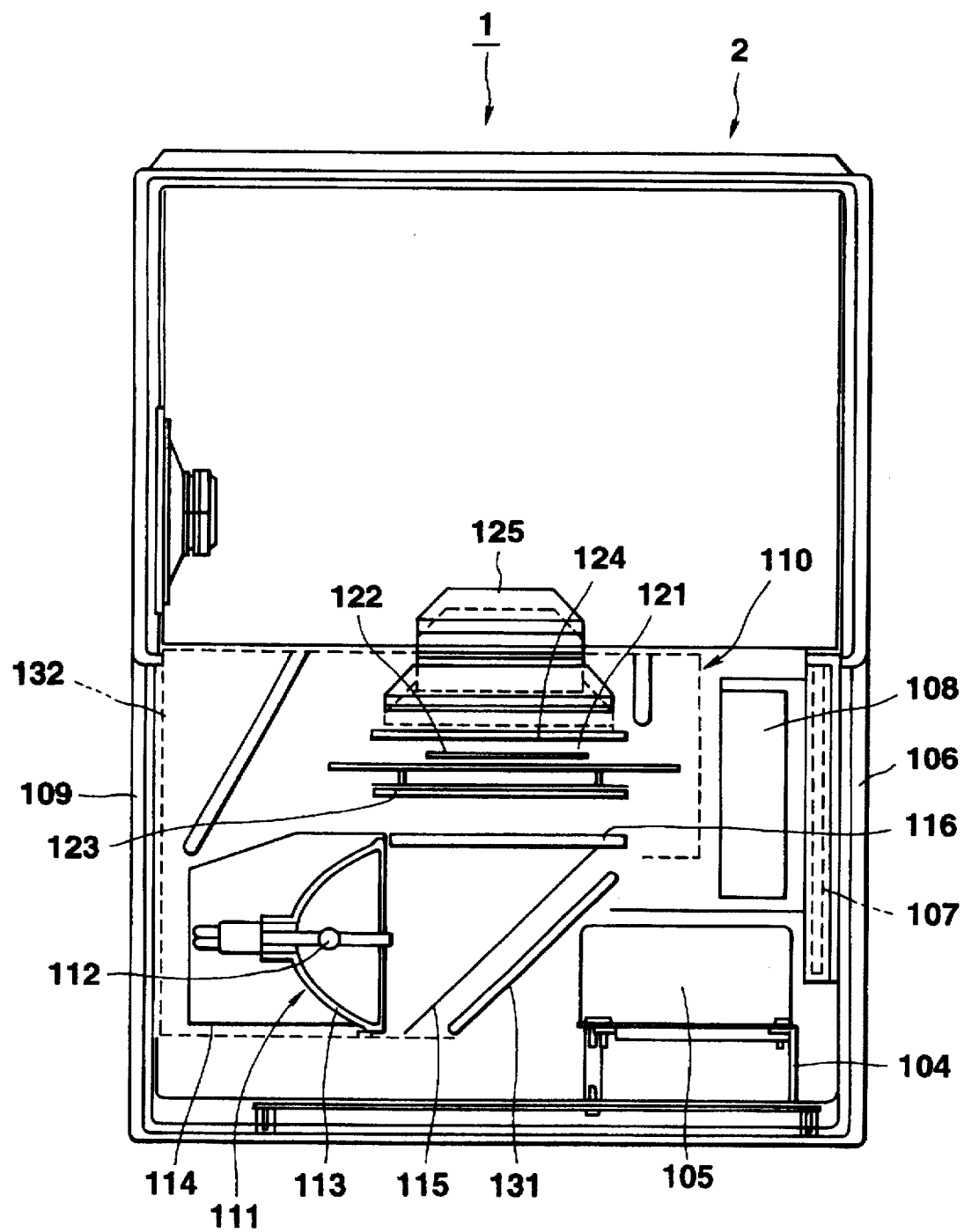
FIG. 6 is a broken away rear view showing a cooling mechanism of a second embodiment of the liquid crystal image projector according to the present invention.
Figure 7:
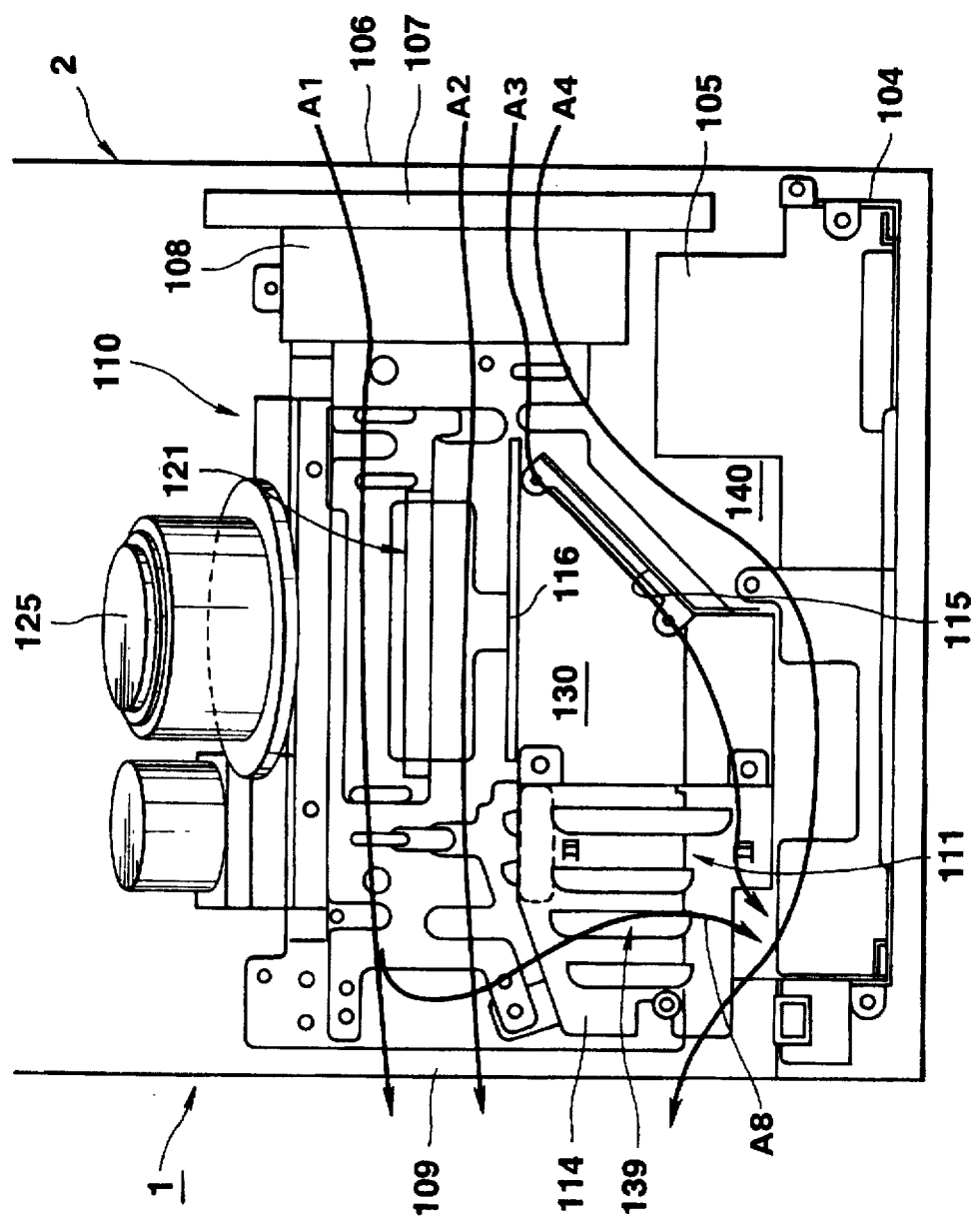
FIG. 7 is an enlarged view showing a cooling air flow in the second embodiment of the liquid crystal image projector of the invention.

FIGS. 6 and 7 are views showing a cooling system in the second embodiment of the liquid crystal projection/television receiver 1. In FIGS. 6 and 7, a reference numeral 105 denotes a power source, 106 is an inlet, 107 is an inlet filter, 108 is a fan, 109 is an outlet, 110 is an optical module, 111 is a light source, 115 is a cold mirror, 116 is a cold filter, 121 is a liquid crystal display module, 122 is a liquid crystal display panel, 125 is a projection lens, 130 is a first air flow channel, and 140 is a second air flow channel.

Within a lower half portion of the housing 2, the power source 105 is mounted on a pedestal 104 which is secured to a lower-right portion of the housing 2, as viewed in FIG. 6. At an upper left portion to the power source 105, the optical module 110 is installed.

The inlet 106 is formed in a right side wall of the housing 2 for taking in external air. In the vicinity of the inlet 106, there are provided inlet filter 7 and the fan 108 for supplying cooling air. The outlet 109 is formed in a left side wall of the housing 2.

The optical module 110 comprises the light source 111, the cold mirror 115, the cold filter 116, the liquid crystal display module 121 and projection lens 125.

At the lower left portion of the housing 2 is installed the light source 111. The light source 111 comprises a reflector 113 and a white lamp 112 which is disposed at a focusing point of the reflector 113 and is supplied with power from the power source 105. Further, the light source is covered with a lamp housing 114.

In the light source 111, white light of the white lamp 112 is reflected from the reflector 113 to be radiated in the right direction as viewed in FIG. 6, and the cold mirror 115 is arranged on an optical axis of the radiated white light. The cold mirror 115 is disposed with a surface thereof inclined at 45 degrees to horizontal in the counter clock wise direction and reflects in the upper direction light components other than ultraviolet light components and heat light components of the white light radiated from the light source 6.

Further, the cold filter 116 and the liquid crystal display module 121 are disposed substantially horizontally (as viewed in FIG. 6) on an optical axis of the light components reflected from the cold mirror 115. The projection lens 125 is disposed at an upper position to the liquid crystal display module 121, which projection lens projects image light transmitted through the liquid crystal display module 121.

The cold filter 116 allows the light components other than ultraviolet light components and heat light components included in the light reflected from the cold mirror 115 to pass through upperwards.

The liquid crystal display module 121 comprises the liquid crystal display panel 122 received in the sealed case.

The liquid crystal display panel 122 comprises liquid crystals filled between a pair of glass plates, and displays an image with liquid crystal display elements driven.

The liquid crystal display module 121 is provided with an incoming polarizing plate 123 and an outgoing polarizing plate 124 in parallel at both sides thereof.

In the liquid crystal projection/television receiver 1 with the above described structure, light emitted from the light source 111 is radiated to the cold mirror 115, and the light reflected from the cold mirror 115 comes in the liquid crystal display panel 122 of the liquid crystal display module 121. The image light transmitted through the liquid crystal display panel 122 with liquid crystal display elements driven is projected through the projection lens 125 in the upperwards direction, and further the image light is reflected from the reflection mirror (not shown) to be projected onto the screen 3 from a rear side thereof.

Figure 8:
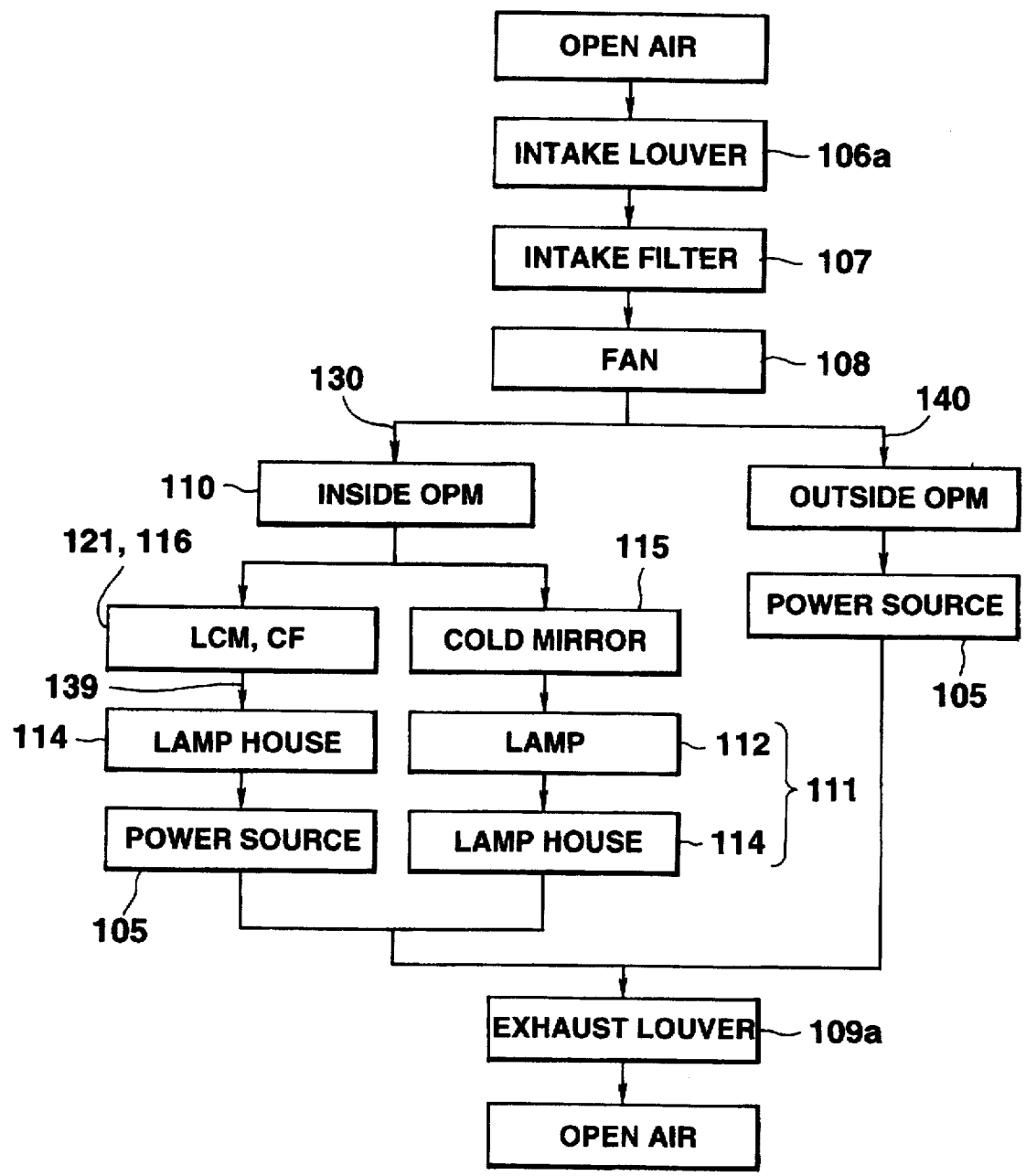
FIG. 8 is a view showing the cooling air flow in the second embodiment.

As shown in FIGS. 7 and 8, the liquid crystal display projection/television receiver 1 is provided with the first air flow channel 130 in the lower half portion of the housing 2 to cool down the optical module 110 including the light source 111, the cold mirror 115, the cold filter 116 and the liquid crystal display module 121, and the second air flow channel 140 for cooling down the power source 105.

The first and second air flow channel 130 and 140 are provided between an inlet 106 formed in a right side wall of the housing 2 and an outlet 109 formed in a left side wall of the housing 2.

The inlet 106 is provided with an inlet louver 230 and the outlet 109 is provided with an outlet louver 230.

In FIG. 8, the fan 8 is denoted by FAN, the optical module 110 by OPM, the liquid crystal module 121 is denoted by LCM, and the cold filter is denoted by CF.

There is provided a wind guide plate 131 under the cold mirror 115 in parallel with the cold mirror 115, as shown in FIG. 6. The wind guide plate 131 forms a portion of an optical module case 32, as shown in FIGS. 9–10.

Figure 9:
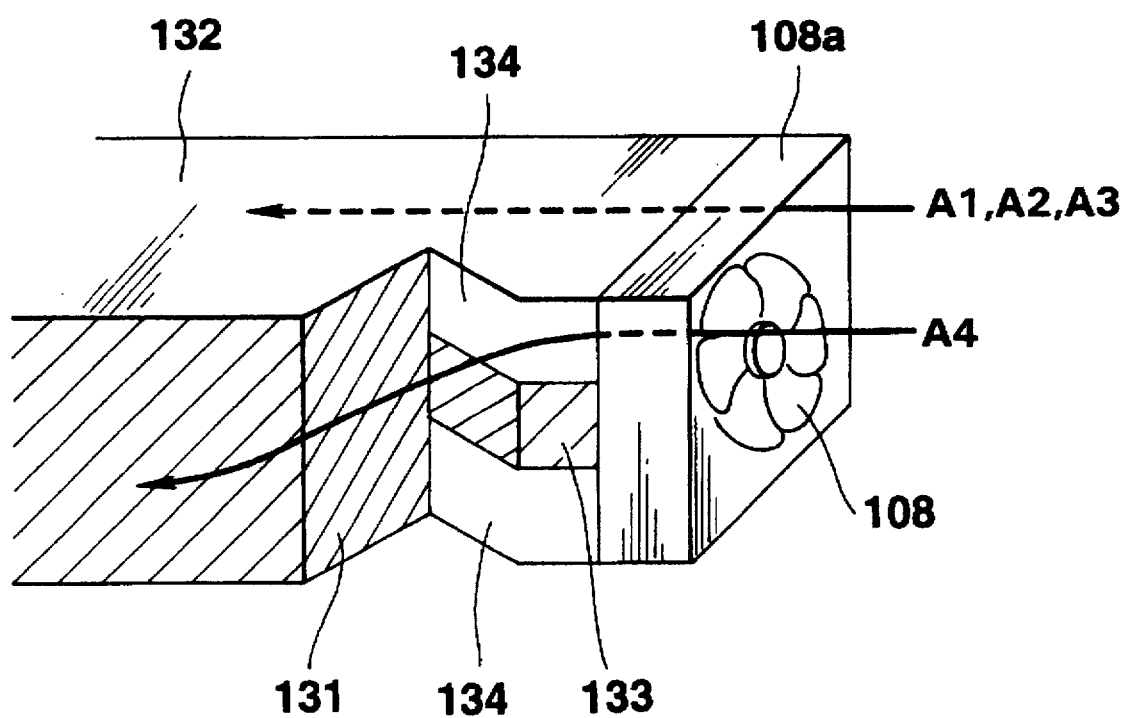
FIG. 9 is a perspective view showing a cooling air intake unit for guiding air from a fan to a second air flow channel in the second embodiment.

The optical module case 132 covers the optical module 110, and is connected to a fan duct 108a, as shown in FIG. 9. The optical module case 132 has a wall 133 continued to the wind guide plate 131, and two openings 134 are formed at both sides of the wall 133.

Figure 10:
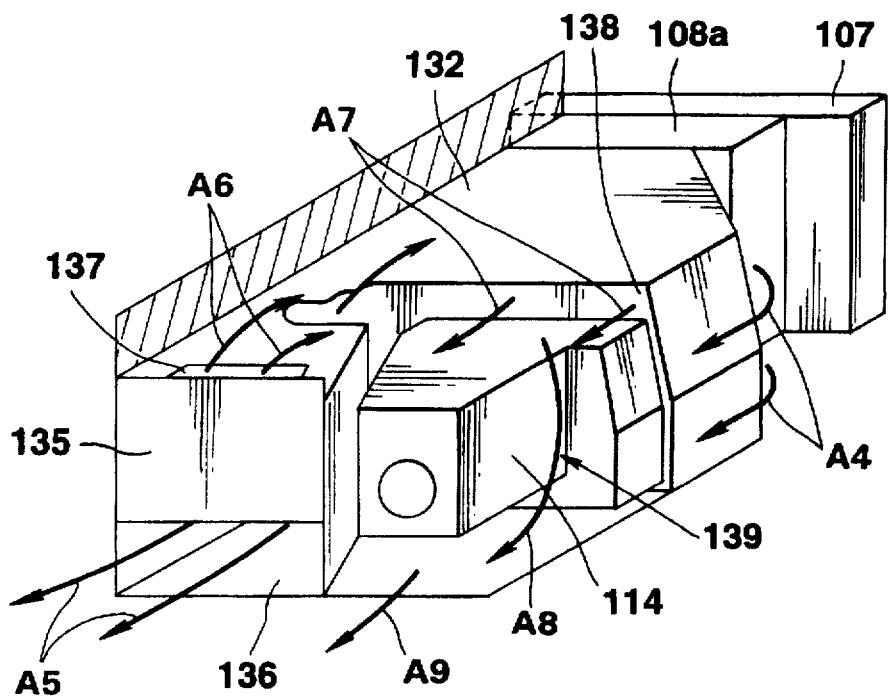
FIG. 10 is a perspective view showing air flow in the vicinity of an optical module in the second embodiment.

As shown in FIG. 10, the optical module case 132 is formed with openings 136, 137 and 138 respectively in a wall 135 facing the outlet 109, a lower portion continuing to the wall 135, and a portion continuing to the lamp house 114.

Figure 11:
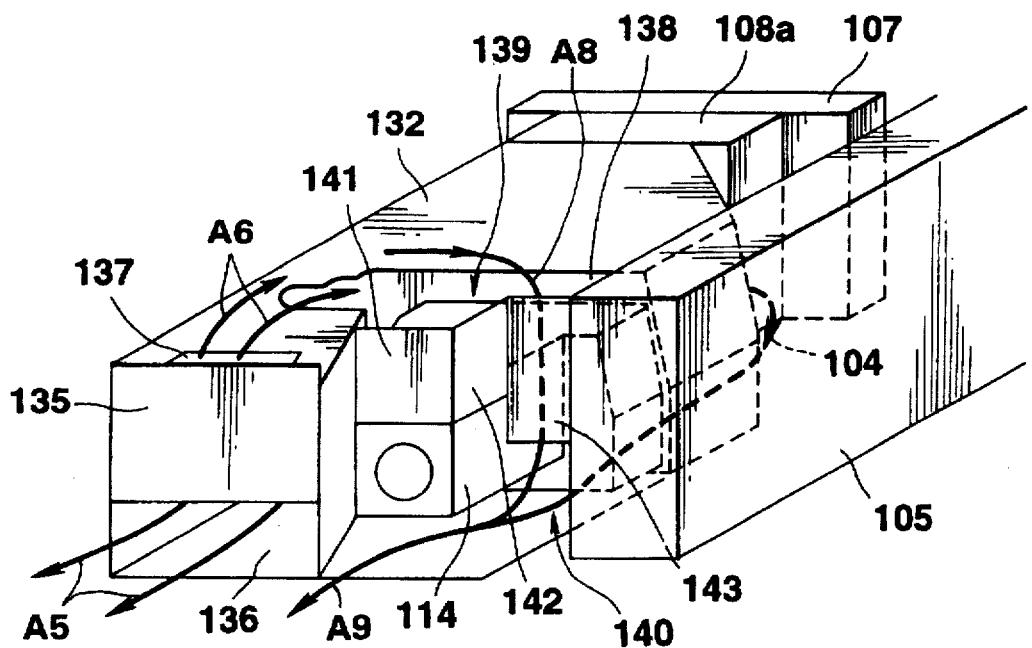
FIG. 11 is a perspective view showing that air flow in the vicinity of the optical module and air flow in the vicinity of a power source run together in the second embodiment.

The openings 137 and 138 form a wind flow channel 139 outside the optical module case 132, which channel is connected to the second air flow channel 140. The wind flow channel 139 is formed by walls 141, 142 and 143 provided on the lamp house 114 so as to allow air flow to run around the lamp house 114, as shown in FIG. 11.

In the liquid crystal projection/television receiver 1 with the above cooling system, the light source 111, the cold mirror 115, the cold filter 116, and the liquid crystal display module 121 are cooled separately and efficiently within the first air flow channel 130 in the optical module case 132 and the power source 105 is cooled efficiently within the second air flow channel 140 outside the optical module case 132, with the power source 105 turned on to drive the fan 108.

As shown in FIG. 8, open air is taken into the housing 2 from the inlet 106 through the inlet louver 106a, the inlet filter 107, and the fan 108 by air intaking operation of the fan 108, and further flows into the first and second air flow channel 130 and 140. The inlet filter 107 removes dust from open air.

In the first air flow channel 130, cooling air flows through the liquid crystal display module 121 and the cold filter 116 to cool them, and further flows through the cold mirror 115, the lamp 112 of the light source 111 and the lamp house 114 to cool them.

Passing through the liquid crystal display module 121 and the cold filter 116, the cooling air flows through the wind flow channel 139 towards the lamp house 114 and the power source 105 to cool them, and goes outside the housing 2 from the exhaust louver 109a and the outlet 109.

Similarly, the cooling air passes through the cold mirror 115, the lamp 112 of the light source 111 and the lamp house 114, and then goes outside the housing 2 from the exhaust louver 109a and the outlet 109.

In the second air flow channel 140, the cooling air passes through the power source 105 to cool same, and then goes outside the housing 2 from the exhaust louver 109a and the outlet 109.

Now, the cooling-air flow will be described in detail.

As shown in FIG. 7, open air taken into the housing 2 through the inlet 106 by the fan 108 is separated to flow through the first air flow channel 130 inside the optical module case 132 (air flows A1, A2 and A3) and to flow through the second air flow channel 140 outside the optical module case 132 (air flow A4).

More specifically, as shown in FIG. 9, open air once taken into the fan dust 108a by the fan 108 goes outside the optical module case 132 from the openings 133 and 134 formed in the wall 133 continued to the wind guide plate 131 of the optical module case 132 to the second air flow channel 140.

Meanwhile, the air flows A1, A2 and A3 flow through the first air flow channel 130 in the optical module case 132, that is, the air flows A1, A2 flow towards the liquid crystal display module 121 and the air flow A3 flows towards the cold mirror 115, as shown in FIG. 7.

The air flows A1 and A2 flowing towards the liquid crystal display module 121 flow along the liquid crystal display panel 122, the incoming polarizing plate 123, the outgoing polarizing plate 124 and cold filter 116 to cool same, and then come to the wall 135 facing the outlet 109 as shown in FIG. 10.

Coming to the wall 135, the air flows A1, A2 partially go outside the optical module case 132 from the opening 136, and further are exhausted from the exhaust outlet 109 (see air flow A5), and partially go outside the optical module case 132 from the opening 137 formed in the sealing of the optical module case 132 (see air flow A6).

The air flow A3 flowing towards the cold mirror 115 flows along the cold mirror 115 to cool same, and further flows towards the light source 111 to cool same.

Meanwhile, air flows around the reflector 113 to cool the reflector 113 and the lamp 112, and further flows into the lamp house 114 from a space provided between the reflector 113 and the lamp house 114 to cool the lamp house 114 from inside, and is exhausted from a louver of the reflector 113.

Then, the air flows go outside the optical module case 132 from the opening 138 formed in the lamp house 114 (air flow A7 of FIG. 10).

The air flows A6 and A7 coming outside the optical module case 132 from the openings 137, 138 are guided by the walls 141, 142 and 143 to flow around the lamp house 114 within the wind flow channel 139 (see air flow A8) to cool the lamp house 114, and then come with the air flows A5, as shown in FIG. 11.

Meanwhile, the air flow A4 flowing through the second air flow channel 140 outside the optical module case 132 flows through the power source 105 for the light source 111 to cool same, and then come together with the air flow A8 which flows through the air flow channel 140 and is exhausted from the outlet 9 (see air flow A9).

In the above liquid crystal projection/television receiver with a single fan 108, the optical module is cooled in the first air flow channel 130 and the power source 105 for the light source 111 is cooled in the second wind channel 140. Therefore, the liquid crystal display elements contained in the liquid crystal display panel 122, optical elements (such as the incoming polarizing plate 123, the outgoing polarizing plate 124, the cold mirror 115 and cold filter 116) and the light source 111, and the power source for the light source 105 can be cooled separately and efficiently.

As described above, the wind flow channel 139 is formed so as to run form near the outlet 109 of the first air flow channel 130 to the second air flow channel 140, and the air flow is guided by the wind flow channel 139 to flow through the lamp house 114 of the light source 111 which will be highest in temperature. Therefore, the light source will be cooled from outside more efficiently.

The present invention has been described with respect to the embodiments of the liquid crystal projection/television receiver of a single plate type, but the present invention is not limited to the liquid crystal projection/television receiver of a single plate type. The present invention may be applied to a single plate type liquid crystal image projector except a projection television receiver and a three plate type liquid crystal image projector including a projection television receiver.

The structure of the air flow channel including an inlet and an outlet may be modified, and a position where the fan is mounted and other detailed structures may be changed within the scope of the invention.

What is claimed is:

1. An image projector comprising:
   a housing having an inlet for allowing air to come inside said housing, and an outlet for allowing air to go outside said housing;
   a liquid crystal display module, arranged in said housing, for displaying an image;
   a light source arranged in said housing in the vicinity of said liquid crystal display module for radiating light to said liquid crystal display module, said light source being located nearer to said outlet than said liquid crystal display module;
   an air flow channel provided within said housing, the air flow channel extending from the inlet of said housing through said liquid crystal display module and said light source to the outlet of said housing;
   a fan provided inside said housing, for generating air flow through said air flow channel;
   an air flow separating unit for separating air flow such that the air flow passes through said liquid crystal display module and the light source separately within said air flow channel; and
   a projecting unit for projecting the image displayed on said liquid crystal display module.

2. An image projector according to claim 1, wherein said liquid crystal display module comprises:
   a liquid crystal display panel; and
   a polarizing plate, the polarizing plate being installed apart from the liquid crystal display panel, for allowing the air flow to pass through between the liquid crystal display panel and the polarizing plate.

3. An image projector according to claim 1, wherein said projecting unit is installed apart from said liquid crystal display module, for allowing the air flow to pass through between said projecting unit and said liquid crystal display module.

4. An image projector according to claim 1, further comprising:
   a power source provided in said housing; and
   a second air flow separating unit, provided in said air flow channel, for allowing the air flow to run towards said power source.

5. An image projector according to claim 1, wherein said liquid crystal display module comprises:
   a sealed member; and
   a liquid crystal display panel provided in said sealed member with a part of said liquid crystal display panel projecting from said sealed member.

6. An image projector according to claim 1, wherein the inlet and the outlet of said housing are in the vicinity of said projecting unit.

7. An image projector comprising:
   a liquid crystal display module for displaying an image;
   a light source for radiating light to said liquid crystal display module;
   a power source for supplying power to said light source;
   a projecting unit for projecting the image displayed on said liquid crystal display module;
   a housing, having a single inlet and a plurality of outlets, for containing therein said liquid crystal display module, said power source and said light source, the single inlet being arranged for allowing air to come inside the housing only through the single inlet and the plurality of outlets being arranged for allowing air to go outside the housing through the plurality of outlets;
   a first air flow channel provided within said housing, the first air flow channel running from the single inlet of said housing through said liquid crystal display module to at least one of the plurality of outlets of said housing;
   a second air flow channel provided within said housing, the second air flow channel running from the single inlet of said housing through said light source to at least one of the plurality of outlets of said housing; and
   a fan in said housing for generating air flow through said first air flow channel and said second air flow channel.

8. An image projector according to claim 7, wherein said first air flow channel and said second air flow channel form a third air flow channel in the vicinity of one of the plurality of outlets of said housing to make the air flow passing through said first air flow channel and the air flow passing through said second air flow channel to join together.

9. An image projector according to claim 7, wherein said first air flow channel is separated in the vicinity of one of the plurality of outlets of said housing to guide the air flow towards said light source.

10. An image projector according to claim 7, wherein said housing has a side wall in which the single inlet is formed and an opposite side wall in which at least one of the plurality of outlets is formed, and wherein the single inlet and one of the plurality of outlets are arranged vertical with respect to said liquid crystal display module.

11. An image projector according to claim 7, further comprising a wind control wall in said housing, and wherein;
   said liquid crystal display module comprises a liquid crystal display panel; and
   said wind control wall is held at an incident side of said liquid crystal display .panel of said liquid crystal display module and apart from said liquid crystal display panel.

12. An image projector according to claim 11, wherein said wind control wall comprises a polarizing plate.

13. An image projector comprising:
   a housing having an inlet and an outlet, the inlet being arranged for allowing air to come inside said housing and the outlet being arranged for allowing air to go outside said housing;

a liquid crystal display panel provided in said housing in the vicinity of the inlet of said housing, for displaying an image;

a light source provided in said housing in the vicinity of the outlet of said housing, for radiating light to said liquid crystal display panel;

a projecting unit for projecting the image displayed on said liquid crystal display panel;

a fan provided in said housing in the vicinity of said liquid crystal display panel, for generating a cooling air flow; and a pair of wind control walls in said housing; and wherein:
said liquid crystal display module comprises a liquid crystal display panel; and
said pair of wind control walls are held at both sides of said liquid crystal display panel of said liquid crystal display module and apart from said liquid crystal display panel.

14. An image projector according to claim 13, wherein:
said fan is arranged to make the cooling air flow pass through spaces between said liquid crystal display panel and said wind control walls.

15. An image projector comprising:

a liquid crystal display module for displaying an image;

a light source for radiating light to said liquid crystal display module;

a projecting unit for projecting the image displayed on said liquid crystal display module;

a housing having an inlet and an outlet for containing said liquid crystal display module and said light source, the inlet being arranged for allowing air to come inside the housing and the outlet being arranged for allowing air to go outside the housing;

an air flow channel provided within said housing, the air flow channel running from the inlet of said housing through said liquid crystal display module and said light source to the outlet of said housing;

a fan provided inside said housing, for generating air flow through said air flow channel; and an air flow separating unit for separating air flow such that the air flow generated by said fan passes through said liquid crystal display module and the light source separately within said air flow channel; and wherein said liquid crystal display module comprises:
a liquid crystal display panel; and
a polarizing plate, the polarizing plate being installed apart from the liquid crystal display panel, for allowing the air flow to pass through between the liquid crystal display panel and the polarizing plate.

16. An image projector comprising:

a liquid crystal display module for displaying an image;

a light source for radiating light to said liquid crystal display module;

a projecting unit for projecting the image displayed on said liquid crystal display module;

a housing having an inlet and an outlet for containing said liquid crystal display module and said light source, the inlet being arranged for allowing air to come inside the housing and the outlet being arranged for allowing air to go outside the housing;

an air flow channel provided within said housing, the air flow channel running from the inlet of said housing through said liquid crystal display module and said light source to the outlet of said housing;

a fan provided inside said housing, for generating air flow through said air flow channel;

an air flow separating unit for separating air flow such that the air flow generated by said fan passes through said liquid crystal display module and the light source separately within said air flow channel;

a power source provided in said housing; and a second air flow separating unit, provided in said air flow channel, for allowing the air flow to run towards said power source.

17. An image projector comprising:

a liquid crystal display module for displaying an image;

a light source for radiating light to said liquid crystal display module;

a projecting unit for projecting the image displayed on said liquid crystal display module;

a housing having an inlet and an outlet for containing said liquid crystal display module and said light source, the inlet being arranged for allowing air to come inside the housing and the outlet being arranged for allowing air to go outside the housing;

an air flow channel provided within said housing, the air flow channel running from the inlet of said housing through said liquid crystal display module and said light source to the outlet of said housing;

a fan provided inside said housing, for generating air flow through said air flow channel; and an air flow separating unit for separating air flow such that the air flow generated by said fan passes through said liquid crystal display module and the light source separately within said air flow channel; and wherein said liquid crystal display module comprises:
a sealed member; and
a liquid crystal display panel provided in said sealed member with a part of the liquid crystal display panel projecting from said sealed member.

18. An image projector comprising:

a liquid crystal display module for displaying an image;

a light source for radiating light to said liquid crystal display module;

a power source for supplying power to said light source;

a projecting unit for projecting the image displayed on said liquid crystal display module;

a housing having an inlet and an outlet for containing said liquid crystal display module, said power source and said light source, the inlet being arranged for allowing air to go outside the housing;

a first air flow channel provided within said housing, the first air flow channel running from the inlet of said housing through said liquid crystal display module and said light source to the outlet of said housing;

a second air flow channel provided within said housing, the second air flow channel running from the inlet of said housing through said light source to the outlet of said housing;

a fan provided inside said housing, for generating air flow through said first air flow channel and said second air flow channel; and a wind control wall; and wherein:
said liquid crystal display module comprises a liquid crystal display panel; and
said wind control wall is held at an incident side of said liquid crystal display panel of said liquid crystal display module and apart from said liquid crystal display panel.

* * * * *